United States Patent
Zann et al.

(10) Patent No.: US 7,479,613 B2
(45) Date of Patent: Jan. 20, 2009

(54) ROTATING AND PIVOTING CONTROL DEVICE

(75) Inventors: Olivier Zann, Urmatt (FR); Dominique Bidard, Kolbsheim (FR); Cedric Ritondo, Strasbourg (FR)

(73) Assignee: Delphi Technologies, Inc, Troy, MI (US)

( * ) Notice: Subject to any disclaimer, the term of this patent is extended or adjusted under 35 U.S.C. 154(b) by 0 days.

(21) Appl. No.: 11/009,292

(22) Filed: Dec. 10, 2004

(65) Prior Publication Data

US 2005/0145054 A1 Jul. 7, 2005

(30) Foreign Application Priority Data

Dec. 12, 2003 (EP) ................. 03360143

(51) Int. Cl.
*H01H 19/00* (2006.01)
(52) U.S. Cl. ............... 200/553; 200/560; 200/7
(58) Field of Classification Search ............ 200/4, 200/5 R, 7, 11 R, 14, 18, 520, 553, 560–567, 200/570, 336, 329, 330, 341
See application file for complete search history.

(56) References Cited

U.S. PATENT DOCUMENTS 5,593,023 A * 1/1997 Kaizaki et al. ............. 200/570
6,080,942 A * 6/2000 Sasaki ....................... 200/17 R
6,100,480 A * 8/2000 Takahashi ................... 200/330
6,211,474 B1 * 4/2001 Takahashi .................... 200/18
6,229,103 B1 * 5/2001 Yamamoto et al. ............ 200/4
6,396,006 B1 * 5/2002 Yokoji et al. .................. 200/4

FOREIGN PATENT DOCUMENTS

EP 12511536 10/2002

* cited by examiner

*Primary Examiner*—Elvin G Enad
*Assistant Examiner*—Marina Fishman
(74) *Attorney, Agent, or Firm*—David P. Wood

(57) ABSTRACT

Control device for activating/deactivating functions, comprising a supporting plate comprising a contact surface providing electrical contacts, a control member for selecting a function with the actuation of a switching means, the control member mounted rotatably about an axis of rotation and pivotably about a pivot axis separate from the axis of rotation, rotation and pivoting of the control member facilitating selection of a function and confirmation of the selected function. The control member may be associated with an actuating lever, of which one end comprises the axis of rotation, and of which the other end is mounted pivotably about the pivot axis, the lever being displaceable between a rest position and at least one active position in which at least one electrical switching means on the supporting plate is actuated for purposes of confirming a function, the axis of rotation and the pivot axis extending in separate extension planes.

11 Claims, 2 Drawing Sheets

ROTATING AND PIVOTING CONTROL DEVICE

BACKGROUND OF THE INVENTION

1. Field of the Invention

The present invention relates to the technical field of control devices associated in particular with automobile vehicles. More particularly, the present invention concerns control devices located near the steering wheel of a vehicle as well as steering columns provided with such control devices.

2. Description of Related Art

The task of optimizing the positioning of control devices in a vehicle often involves the dual objectives of facilitating convenient access to the control devices on the one hand and avoiding the user having to let go of the steering wheel or avert the user's eyes from the road on the other hand. It is known that a control device can be constructed for activating/deactivating functions, particularly of an automobile vehicle, comprising:

a housing in which is produced a contact surface, making electrical contacts, a control member selecting and confirming a function with the actuation of electrical contacts, the control member being mounted rotatably on an axis of rotation and pivotably about a pivot axis separate from the axis of rotation, rotation and pivoting of the control member making it possible to select a function and to confirm the selected function respectively.

There is known, for example, through document EP-1 251 536, a control member mounted rotatably on a first axis of rotation and pivotably on a pivot axis orthogonal to the axis of rotation. In this device, the two axes are co-planar, and the pivot axis is embodied by a trunnion mounted in a complementary receptacle integral with the housing and arranged under a supporting plate comprising an electrical circuit. The device also has a control member traversing the supporting plate. Unfortunately, such devices necessitate the use of a large number of parts and entail relatively complex assembly procedures insofar as some of the parts in such devices must traverse the supporting plate. This often gives rise to high costs. Moreover, the use of stepping-down by a gear system in such devices inevitably results in the presence of hysteresis and play in operation and assembly, contributing to complexity in the assembly process and decreasing reliability in the use of such devices.

BRIEF SUMMARY OF THE INVENTION

It is therefore an object of the present invention to produce a control device comprising a reduced number of parts and improved simplicity in assembly of the device. Another object is to reduce the costs of manufacture of such devices.

According to an exemplary embodiment of the invention, a control member is associated with an actuating lever of which one end comprises an axis of rotation and of which the other end is mounted pivotably about a pivot axis, the lever being displaceable between a rest position and at least one active position in which at least one electrical contact on a contact surface is actuated for purposes of confirming a function, the axis of rotation and the pivot axis extending in separate extension planes. It is thus possible to dispose the pivot axis in the housing so as to produce an electrical circuit while minimizing the need for passages to accommodate the control member.

In an exemplary embodiment, a control device may also include a control member, an actuating lever and means for making electrical connections and switching, some or all of which may be arranged on, and in the vicinity of, the same face of a supporting plate, on which the electrical circuit may be provided.

According to an exemplary embodiment, the control member may comprise a wheel mounted rotatably on the free end of the actuating lever and associated with a revolving electrical connection on the contact surface. The wheel may facilitate, for example, selecting a function or a command.

According to an exemplary embodiment, the wheel may include an indexing surface, associated with an indexing finger biased by a spring and mounted on the lever approximately parallel to the axis of rotation, thus exerting an elastic bearing on the indexing surface. The different functions of accessible controls may thus be made to be more easily differentiated from each other.

According to an exemplary embodiment, a device ay also comprise locking means configured for preventing rotation of the wheel during displacement of the lever in at least one active position. Thus it may be possible to guard against poor manipulation of the control, such as through the simultaneous actions of rotating the wheel and pivoting the lever so as to confirm, or indicate, a function a function other than the desired function.

According to an exemplary embodiment, the revolving electrical connection is obtained with flexible conductive strips integral with the wheel and in contact with conductive tracks integral with the contact surface. In accordance with this embodiment, adjustment of play of the moving mechanical parts is obtained, this being with a reduced number of parts and reduced space requirements.

According to an exemplary embodiment, the lever is provided between the wheel and the pivot axis, with a bearing member which actuates the electrical control member. In accordance with this embodiment, it is possible to eliminate mechanical play and provide a desired level of force on the switching means during actuation thereof. The position of the electrical switching member can thus be the position chosen in different locations of the contact surface, taking into account the configuration or dimensions of the contact surfaces of the electrical circuit.

In an exemplary embodiment, a device may also comprise elastic return means biasing the actuating lever in case of pivoting in at least one active position so as to bias the level toward its rest position.

In an exemplary embodiment, the respective planes, in which the pivot axis and the axis of rotation extend, are parallel planes.

In an exemplary embodiment, the respective planes, in which the pivot axis and the axis of rotation extend, are intersecting planes.

The present invention also concerns a control on the steering wheel comprising a device as described above.

BRIEF DESCRIPTION OF THE SEVERAL VIEWS OF THE DRAWINGS

Other characteristics and advantages will also be apparent from the detailed description shown below, given as an example with reference to the attached drawings, in which.

DETAILED DESCRIPTION OF THE INVENTION

Figure 1:
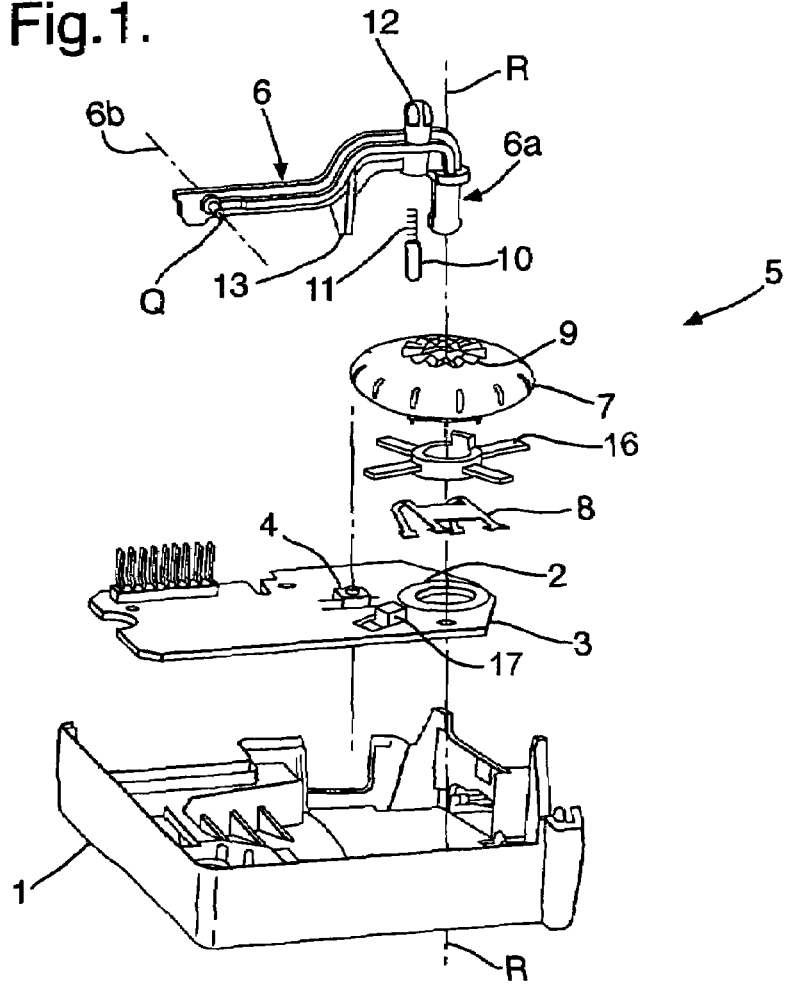
FIG. 1 is an exploded view of an exemplary embodiment of the control device according to the invention.

The exemplary control device shown, for example, in FIG. 1 makes it possible to select, deactivate, activate, or otherwise control functions of a vehicle. The control device comprises a housing 1, in which is produced a contact surface 2 making electrical contacts. This contact surface 2 is, for example, produced on a supporting plate 3, which also facilitates production of an electrical or electronic circuit that may be associated with the control device.

A switching means 4 is also provided on the supporting plate 3. The control device also comprises a control member 5 selecting and confirming a function with actuation of electrical contacts produced in particular with the switching means 4. The latter is, for example, produced with a microswithch or a metal dome.

The control member 5 may be mounted rotatably on an axis of rotation R and pivotably about a pivot axis Q separate from the axis of rotation R. Rotation and pivoting of the control member 5 make is possible to select a function and to confirm the selected function respectively.

The control member 5 is associated with an actuating lever 6, of which one end 6a, corresponding to the free end, comprises the axis of rotation R, and of which the other end 6b is mounted pivotably about the pivot axis Q. The actuating lever 6 is displaceable between a rest position and at least one active position in which at least one electrical switching means 4 of the supporting plate 3 is actuated for purposes of confirmation of a function.

According to the invention, the axis of rotation R and the pivot axis Q extend in separate extension planes.

The control member 5 may comprise, for example, a rotatable wheel 7 mounted on the free end 6a of the actuating lever 6. The wheel 7 is associated with a means for facilitating the rotary electrical connection on the contact surface 2.

The rotary electrical connection may be, for example, obtained with flexible conductive strips 8 integral with the wheel 7 and in contact with conductive tracks forming the contact surface 2. The flexible conductive strips 8 may be shaped so as to remain integral with the wheel 7 and make contact with the contact surface 2. The flexibility of the flexible conductive strips 8 makes it possible to adjust the mechanical play existing between the different moving parts and in particular between the wheel 7 and the actuating lever 6. The flexible strips 8 may also be configured to allow elastic return of the wheel 7 to its rest position.

The electrical connection between the flexible conductive strips 8 and the conductive tracks may therefore be maintained in spite of inevitable appearance of mechanical play after assembly of the component parts of the control device.

In an exemplary embodiment, the wheel 7 may also include an indexing surface 9 associated with an indexing finger 10 biased by a spring 11. In accordance with this embodiment, the indexing finger 10 may be mounted on the actuating lever 6, approximately parallel to the axis of rotation R, and so may exert an elastic bearing on the indexing surface 9.

The actuating lever 6 may also comprise a receptacle 12 designed to receive a spring 11 as well as the indexing finger 10 movable by translation in the receptacle 12.

Figure 2:
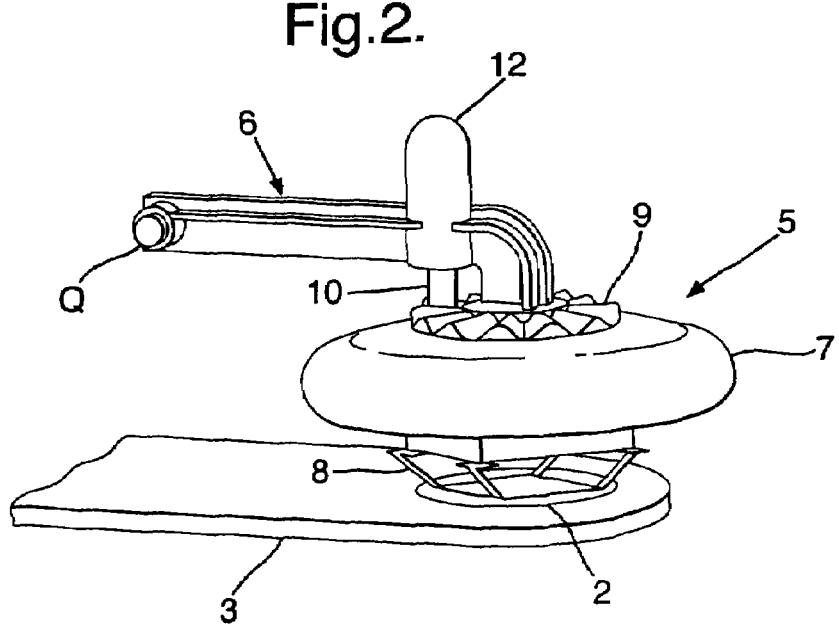
FIG. 2 is a perspective view of an exemplary embodiment of the control device according to the invention once assembled, and FIGS. 3 and 4 schematise an exemplary embodiment of the control device according to the invention, in different states of operation.

In the embodiment shown in FIGS. 1 and 2, the wheel 7 is elastically returned to the same position on the free end 6a of the actuating lever 6, this being due to the indexing finger 10 associated with the spring 11.

According to an exemplary embodiment of the control device according to the invention, the latter comprises locking means preventing rotation of the wheel 7 during displacement of the actuating lever 6 in at least one active position.

The locking means may consist, for example, of spokes 16 extending radially under the wheel 7, which engage with a block 17 integral with the supporting plate 3 when a user exerts a pressure on the wheel 7. The latter may then be substantially locked to prevent or at least minimize undesired or unintentional rotation.

In an exemplary embodiment, the actuating lever 6 may be provided between the wheel 7 and the pivot axis Q of a bearing member 13, which may be configured to actuate the switching means 4.

In an exemplary embodiment, a control device according to the invention may also comprise an elastic return means configured to bias the actuating lever 6 in case of pivoting in at least one active position in order to bias the lever toward its rest position.

Figure 3:
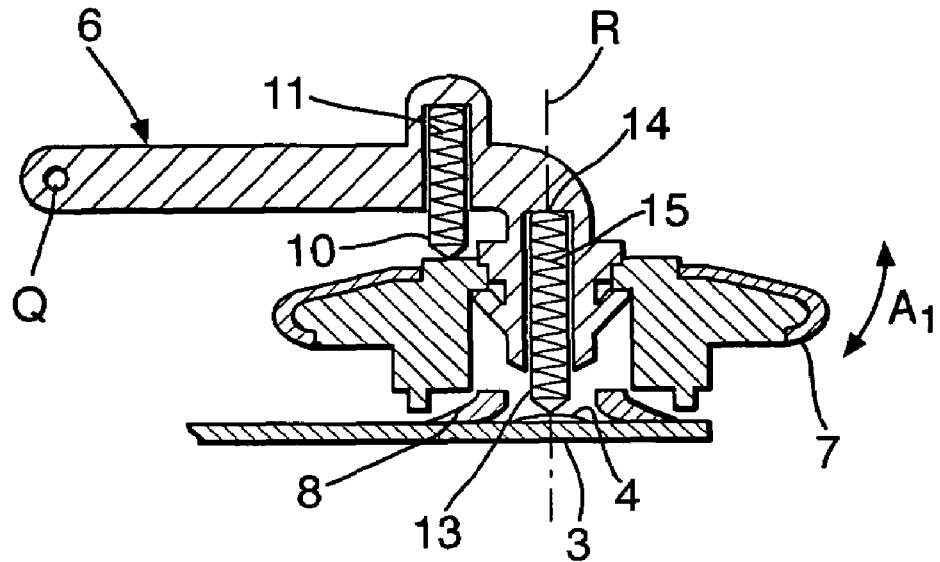
Figure 4:
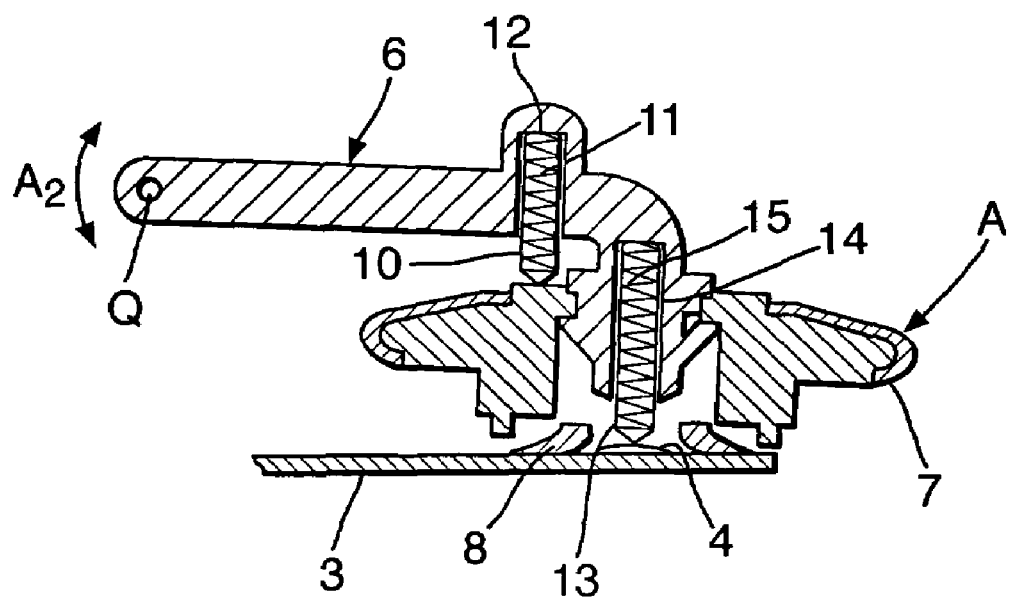

In an exemplary embodiment, for example as shown in FIGS. 2, 3 and 4, a bearing member 13 may be a movable finger, mounted translationally in a complementary receptacle 14 formed in the end 6a of the actuating lever 6. Displacement of the bearing member 13 may be effected by biasing a complementary spring 15 mounted between the bearing member 13 and the bottom of the complementary receptacle 14. The bearing member 13 may thus comes into contact with the switching means 4 arranged on the supporting plate 3. The complementary spring 15 may thus produce an elastic return means, biasing the actuating lever 6 in order to bias the lever toward, or partially or fully return the lever to, its rest position.

Thus, after selecting a function with the aid of the wheel 7, such as by rotational displacement of the wheel 7 about the axis of rotation R, the user may confirm such function by exerting a pressure on the wheel 7, causing pivoting of the control member 5 about the pivot axis Q, and thereby allowing actuation of the switching means 4 through means of the bearing member 13. This actuation may be effected owing to compression of the complementary spring 15, which may be configured and positioned to allow the actuating lever 6 to return to its rest position when the user no longer exerts pressure on the wheel 7.

Rotation about the axis R, pivoting about the pivot axis Q and the pressure exerted on the wheel 7 are schematised in FIGS. 3 and 4 by means of the respective references A1, A2 and A.

According to an exemplary embodiment of the control device according to the invention, the respective extension planes, in which the axis of rotation R and the pivot axis Q extend, are parallel.

According to another exemplary embodiment according to the invention, the respective extension planes, in which the pivot axis Q and the axis of rotation R extend, are intersecting. In accordance with this exemplary embodiment, the axis of rotation R and the pivot axis Q are, therefore, not co-planar.

According to an exemplary embodiment of the device according to the invention, the axis of rotation R and the pivot axis Q are orthogonal.

The device according to the invention, therefore, may be constituted so as to be highly compact relative to prior art devices. In fact, the device, once assembled, may, in one embodiment, constitute only a single one-piece subassembly such that the subassembly may be clipped on its pivot axis Q. Positioning of the pivot axis Q, clipping, and maintenance in the housing 1 may, accordingly, be effected in a single phase of the assembly process.

The device according to the invention may also noticeably reduce any associated functional play noticeably and may reduce any need for the use of lubricants to reduce friction. The resulting device may therefore offer advantages in its ecology and economy.

What is claimed is:

1. A control device for activating and/or deactivating functions comprising:
   a supporting plate contained within a housing, the supporting plate comprising a contact surface providing one or more electrical contacts;
   an actuating lever mounted pivotably about a pivot axis, said actuating lever having a free end that defines an axis of rotation; and
      a control member mounted rotatably about said free end, said control member comprising switching means configured for selecting and confirming a function;
   wherein;
   said pivot axis is substantially parallel to said supporting plate and is separate from, and substantially orthogonal to, the axis of rotation;
   rotation of the control member and pivoting of the actuating lever are configured to facilitate selection of a function and confirmation of the selected function;
   the lever is displaceable between a rest position and at least one active position in which at least one electrical switching means on the supporting plate is actuated to facilitate confirming a function; and
   the axis of rotation is substantially orthogonal to the contact surface when the lever is in its active position.

2. A control device according to claim 1, wherein the control member comprises a wheel mounted rotatably on the free end of the actuating lever and associated with a revolving electrical connection on the contact surface.

3. A control device according to claim 2, wherein the wheel has an indexing surface positioned approximately orthogonal to the axis of rotation, and wherein the control device further comprises:
   an indexing finger positioned between the actuating lever and the indexing surface, said indexing finger begin oriented approximately parallel to the axis of rotation, and
   a spring positioned and configured for biasing the indexing finger against the indexing surface.

4. A control device according to claim 2, further comprising locking means configured to minimize rotation of the wheel during displacement of the actuating lever in at least one active position, the locking means comprising spokes extending radially under the wheel and engaging a block integral with the supporting plate.

5. A control device according to claim 2, wherein the revolving electrical connection comprises a plurality of flexible conductive strips integral with the wheel and in contact with conductive tracks forming the contact surface.

6. A control device according to claim 2, wherein the lever comprises a bearing member positioned between the wheel and the pivot axis and configured to facilitate actuating the switching means.

7. A control device according to claim 1, further comprising an elastic return means configured to facilitate biasing the actuating lever in case of pivoting in at least one active position so as to bias the lever toward its rest position.

8. A control device according to claim 1, wherein the respective extension planes, in which the pivot axis and the axis of rotation-extend, are parallel.

9. A control device according to claim 1, wherein the respective extension planes, in which the pivot axis and the axis of rotation-extend, are intersecting.

10. A control device according to claim 1, wherein the respective extension planes, in which the axis of rotation and the pivot axis-extend are orthogonal.

11. A control on the steering wheel of a vehicle comprising a control device according to claim 1.

* * * * *